Figure 1:
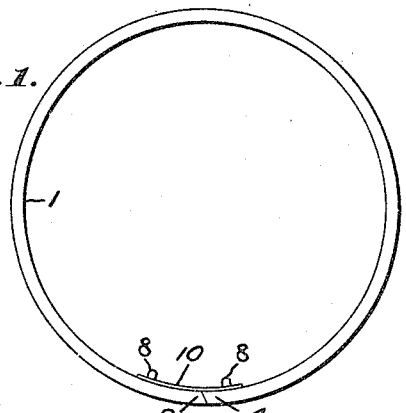

H. R. BAILEY.
DEMOUNTABLE WHEEL RIM.
APPLICATION FILED MAR. 14, 1916.

1,236,250.

Patented Aug. 7, 1917.

Inventor:
Harrison R. Bailey,

UNITED STATES PATENT OFFICE.

HARRISON R. BAILEY, OF BOSTON, MASSACHUSETTS.

DEMOUNTABLE WHEEL-RIM.

1,236,250.  Specification of Letters Patent.  Patented Aug. 7, 1917.

Application filed March 14, 1916. Serial No. 84,002.

*To all whom it may concern:*

Be it known that I, HARRISON R. BAILEY, a citizen of the United States, and a resident of Boston, county of Suffolk, and Commonwealth of Massachusetts, have invented an Improvement in Demountable Wheel-Rims, of which the following description, in connection with the accompanying drawings, is a specification, like characters on the drawings representing like parts.

This invention relates to demountable rims for wheels, is particularly adapted for automobile wheels, and aims to produce both a rim having many advantages over those now in use; and a tool for operating the same.

In the drawings of one embodiment of my invention selected for illustration and description herein,—

Figure 2:
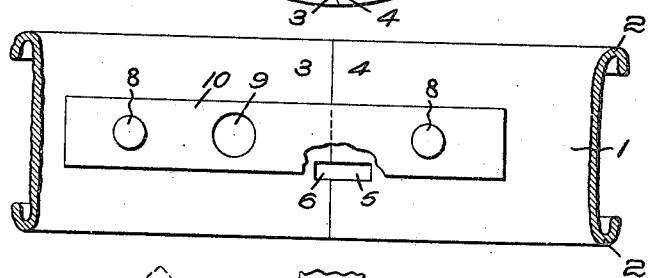
Figure 3:
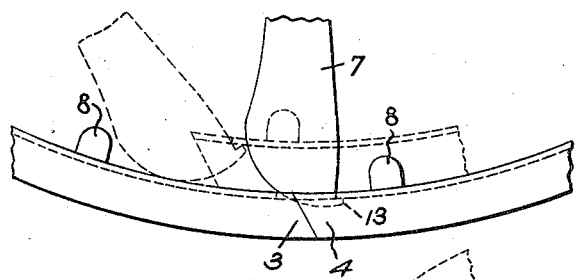
Figure 4:
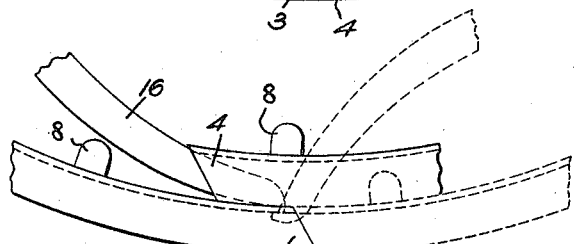
Figure 5:
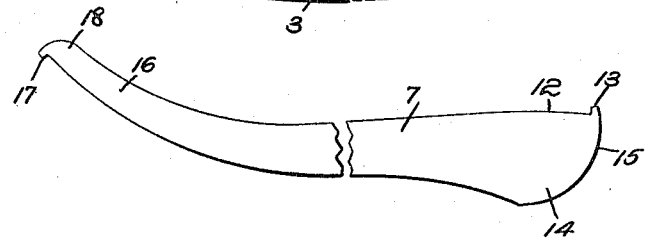

Figure 1 is a side view of one form of my improved rim;

Fig. 2, an inner face view, on an enlarged scale, of the two rim ends in locked position, parts of the rim being broken away;

Fig. 3, a side, or edge view in full lines of the rim ends in closed position with the rim tool in rim-opening or collapsing position, to open the rim, and showing in dotted lines, the rim collapsed;

Fig. 4, a similar view, showing in full lines, the open or collapsed rim ends with the tool in rim-closing position, and showing also, in dotted lines, the rim ends in closed position; and Fig. 5, a face view of the tool.

Referring to Figs. 1, 2, my invention is there shown as embodied in a rim of the clencher type, comprising a rim base or body 1 having the usual inturned flange 2, 2, on either edge. The rim is cut or split crosswise, preferably at a convenient angle providing the two normally registering rim ends 3, 4.

For manipulating my novel rim I have provided simple tool engaging means. One, or if preferred, both of the rim ends are provided, Fig. 2, with suitable tool-engaging depressions, or herein slots 5, 6, the slot 5 in the rim end 4 being preferably somewhat longer than the slot 6 in the rim end 3, to receive the tool 7.

The rim is also provided with a suitable anti-creeping device as an inwardly extended lug or post 8 on each rim end to prevent creeping of the rim on the wheel, and these lugs are received in suitable slots therefor in the felly of the wheel, not shown.

While it is not necessary, I prefer to provide some means to assist in retaining the opposite rim ends 3, 4, in adjusted position, particularly while the rim is not on the wheel, as a plate 10 having perforations therein to receive the posts 8, 8, and also to register with the valve slot 9.

For operating my novel rim I have also conceived an improved form of tool. One convenient form of this improved tire tool for collapsing and closing my novel rim is shown in Fig. 5. The shank 7 is preferably tapering and gradually enlarged toward the unlocking end 11, that end having a gradually curved face 12 leading to a sharp lip or toe 13, and opposite the same is a rounded heel 14 and curved end 15.

The opposite or locking end 16 is of a generally similar outline but smaller, having a toe 17 and heel 18. In Fig. 3, I have illustrated the rim in normal or locked position. When it is desired to collapse the rim, the large or unlocking end 11 of the tool 7 is positioned, as shown in Fig. 3, with the toe 13 thereof beneath and engaging the edge of the rim in slot 5, and the heel 14 of the tool resting upon the rim edge in slot 6.

The rim end 4 now may be readily raised by depressing the upper end of the tool 7, and when the rim end is raised above the upper edge of the opposite rim end 3, it will naturally spring inwardly and carry the tool 7 backward to the position shown in dotted lines in Fig. 3.

The collapsing of the rim as described will of course pull the flanges 2, 2, from about the respective beads of the tire, not shown, for a distance of several inches adjacent that end so that one can readily place the usual tire iron beneath the tire bead and remove the tire from the rim in the usual manner.

To place a tire on the rim, the tire beads are forced beneath the flanges 2, 2, in the usual manner throughout the circumference of the rim with the exception of the collapsed rim end 4. The rim tool 7 is next positioned as shown in Fig. 4, full lines, with its locking end 16 inserted beneath the collapsed rim end 4, and then pushed forward adjacent the rim, until the toe 17 thereof engages the edge of the rim end 3 in the slot 6.

The tool is then raised to dotted line position Fig. 4, carrying the collapsed rim end back to normal position shown in dotted lines in Fig. 4.

This pushing of the rim 4 back into position will permit the beads on the tire to be readily forced beneath the flanges 2, 2, along the collapsed tire end 4 in the usual manner, in fact the beads will practically seat themselves, and the ends may be then locked in position by replacing the plate 10 as shown in Fig. 2.

The rim may be secured to the wheel in any convenient and satisfactory manner but my invention has nothing to do with the means for fastening the rim to the wheel.

At the present time it is a very difficult task to remove a tire that has been a long time on a rim, inasmuch as it becomes rusted on so firmly that a great deal of effort and time are required to remove it. Of course the larger the tire the greater the difficulty in removing it from the rim.

By the use of my improved rim and tool for operating the same, advantage can be taken of the natural tendency of the rim to collapse when one end is out of normal position and by disengaging the rim ends, the rim flanges are automatically withdrawn from about the tire beads for a short distance.

I know of no other rim that can be collapsed and again closed or locked so readily. The tool engaging means is simple but effective and there is absolutely nothing to get out of order. My improved rim and tool for opening and closing the same, are both simple of construction and readily usable.

A suitable purchase is obtained for the tool so that if the rim has rusted to the beads of the tire, it may be pulled therefrom without excessive effort to permit the rim ends to collapse; and this initial separation of the tire from the rim permits the tire thereafter to be readily removed when a new tire is to be applied thereto. The same purchase is readily obtainable for pressing or forcing the collapsed rim end back into position.

I am aware that other tools have been constructed for collapsing tire rims, but so far as I have observed they are complicated in construction, some comprise many members, including clamping members or ends for engaging the opposite rim ends, and also a pivoted lever member for collapsing and closing the rim ends. These tools are large, necessarily occupy a great deal of room in the tool box, and are relatively expensive.

My novel tool is inexpensive to make, cannot be readily broken and is extremely simple of manipulation. It will be evident from the description of my invention that it may be embodied in rims of other forms, including the straight side type of rim.

Having described one form of my novel rim and tool therefor, I claim:

A demountable, one-piece, trans-split wheel rim, having a tool engaging slot located partly in each rim end, plate engaging means on the rim ends, and a locking plate therefor.

In testimony whereof, I have signed my name to this specification, in the presence of two subscribing witnesses.

HARRISON R. BAILEY.

Witnesses:
 EVERETT S. EMERY,
 ELIZABETH P. HILLIARD.

Copies of this patent may be obtained for five cents each, by addressing the "Commissioner of Patents, Washington, D. C."